(12) United States Patent
Wang et al.

(10) Patent No.: US 12,093,721 B2
(45) Date of Patent: Sep. 17, 2024

(54) METHOD FOR PROCESSING DATA, ELECTRONIC DEVICE AND STORAGE MEDIUM

(71) Applicant: Beijing Baidu Netcom Science Technology Co., Ltd., Beijing (CN)

(72) Inventors: Tianfei Wang, Beijing (CN); Buhe Han, Beijing (CN); Zhen Chen, Beijing (CN); Lei Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 54 days.

(21) Appl. No.: 17/942,696

(22) Filed: Sep. 12, 2022

(65) Prior Publication Data
US 2023/0305882 A1      Sep. 28, 2023

(30) Foreign Application Priority Data

Mar. 28, 2022   (CN) .......................... 202210313235.0

(51) Int. Cl.
*G06F 9/48*      (2006.01)
(52) U.S. Cl.
CPC ............................... *G06F 9/4812* (2013.01)
(58) Field of Classification Search
CPC ........................... G11C 16/0483; Y02D 10/00
See application file for complete search history.

(56) References Cited

U.S. PATENT DOCUMENTS

| 2005/0015768 | A1* | 1/2005 | Moore | ................. | G06F 9/4881 |
| | | | | | 718/102 |
| 2019/0147337 | A1 | 5/2019 | Yang | | |
| 2021/0049465 | A1* | 2/2021 | Bogdan | ................. | G06N 3/045 |
| 2021/0133620 | A1 | 5/2021 | Frank et al. | | |

FOREIGN PATENT DOCUMENTS

| CN | 111340237 A | 6/2020 |
| CN | 111860820 A | 10/2020 |
| CN | 112561051 A | 3/2021 |
| CN | 113342345 A | 9/2021 |
| CN | 113703741 A | 11/2021 |
| WO | WO 2018/200899 A1 | 11/2018 |
| WO | WO 2021/108122 A1 | 6/2021 |
| WO | WO 2022/022670 A1 | 2/2022 |

OTHER PUBLICATIONS

First Search Report for CN Application No. 2022103132350 in 1 page.
Extended European Search Report for Application No. 22193870.7, dated May 15, 2023 in 10 pages.

* cited by examiner

*Primary Examiner* — Henry Tsai
*Assistant Examiner* — Juanito C Borromeo
(74) *Attorney, Agent, or Firm* — Knobbe, Martens, Olson & Bear, LLP

(57) ABSTRACT

Provided are a method for processing data, an electronic device and a storage medium, which relate to the field of deep learning and data processing. The method may include: multiple target operators of a target model are acquired; the multiple target operators are divided into at least one operator group, according to an operation sequence of each of the multiple target operators in the target model, wherein at least one target operator in each of the at least one operator group is operated by the same processor and is operated within the same target operation period; and the at least one operator group is output.

18 Claims, 4 Drawing Sheets

METHOD FOR PROCESSING DATA, ELECTRONIC DEVICE AND STORAGE MEDIUM

CROSS REFERENCE TO RELATED APPLICATIONS

The present disclosure claims priority to Chinese Patent Application No. 202210313235.0, filed on Mar. 28, 2022 and title "Method for Processing Data and Apparatus, Electronic Device and Storage Medium," which is incorporated by reference in its entirety.

TECHNICAL FIELD

The present disclosure relates to the fields of deep learning and data processing, and in particular, to a method for processing data, an electronic device and a storage medium.

BACKGROUND

At present, when Field Programmable Gate Array (FPGA) hardware is used to process a network model, operators being dispatched and operated on an FPGA and a Central Processing Unit (CPU) one by one results in operations such as system interruption, register configuration and context switching each time. As a result, extra time is required to be consumed.

SUMMARY

The present disclosure provides a method for processing data, an electronic device and a storage medium.

According to one aspect of the present disclosure, a method for processing data is provided. The method may include: multiple target operators of a target model is acquired; the multiple target operators are divided into at least one operator group, according to an operation sequence of each of the multiple target operators in the target model, where at least one target operator in each of the at least one operator group is operated by the same processor and is operated within the same target operation period; and the at least one operator group is output.

According to another aspect of the present disclosure, an another method for processing data is provided. The method may include: at least one operator group of a target model is acquired, wherein the at least one operator group is acquired by dividing multiple target operators of the target model according to an operation sequence of each of the multiple target operators in the target model; and for each of the at least one operator group, at least one target operator in each of the at least one operator group is operated on the same processor within the same target operation period, to obtain an operation result.

According to another aspect of the present disclosure, an electronic device is provided. The electronic device may include: at least one processor; and a memory, communicatively connected with the at least one processor, wherein the memory stores at least one instruction executable by the at least one processor, and the at least one instruction is performed by the at least one processor, so as to enable the at least one processor to perform the following steps: multiple target operators of a target model is acquired; the multiple target operators are divided into at least one operator group, according to an operation sequence of each of the multiple target operators in the target model, where at least one target operator in each of the at least one operator group is operated by the same processor and is operated within the same target operation period; and the at least one operator group is output.

According to another aspect of the present disclosure, a non-transitory computer-readable storing at least one computer instruction is provided, wherein the at least one computer instruction is used for a computer to perform the method for processing data according to the embodiments of the present disclosure.

It should be understood that, the content described in this section is not intended to identify key or important features of the embodiments of the present disclosure, nor is it intended to limit the scope of the present disclosure. Other features of the present disclosure will become easy to understand through the following description.

BRIEF DESCRIPTION OF THE DRAWINGS

The accompanying drawings are configured to better understand the solution, and are not to be construed as limiting the present disclosure. In the accompanying drawings.

DETAILED DESCRIPTION OF THE EMBODIMENTS

Exemplary embodiments of the present disclosure are described in detail below with reference to the drawings, including various details of the embodiments of the present disclosure to facilitate understanding, and should be regarded as merely exemplary. Thus, those of ordinary skilled in the art shall understand that, variations and modifications can be made on the embodiments described herein, without departing from the scope and spirit of the present disclosure. Likewise, for clarity and conciseness, descriptions of well-known functions and structures are omitted in the following description.

The method for processing data according to an embodiment of the present disclosure is further introduced below.

Operators being dispatched and operated on an FPGA and a CPU one by one results in operations such as system interruption, register configuration and context switching each time. As a result, extra time is required to be consumed, and there is a technical problem of low operation efficiency of a model.

For example, a network structure of a target model is shown as follows.

Convolution 1(conv1)->Convolution 2 (conv2)->Pooling 1 (pool1)->Reshaping (reshape)->Convolution 3 (conv3)->Fully connected layer 1 (fc1)

These operators are dispatched and operated. The CPU sends configuration to the FPGA through a driver and an Advanced extensible Interface (AXI) bus. Then, the driver enters a blocking state. When the FPGA ends an operation, the FPGA sends interruption to the CPU, and then the driver continues to executing. In this way, an Operator (OP) operation ends, and then a next operator is configured for operation. A specific sequence includes the following.

The first CPU dispatching: operating conv1;
The second CPU dispatching: operating conv2;
The third CPU dispatching: operating pool1;
The fourth CPU dispatching: operating reshape;
The fifth CPU dispatching: operating conv3; and
The sixth CPU dispatching: operating fc1.

Two parts in the above process may impact performance. One is that a prediction framework changes from a user mode of an operating system to a kernel mode, and then returns back to the user mode, which requires context switching. Two is that an operation of each of at least one operator needs to be processed an interruption, A multi-user network operating system (Linux) has relatively poor response to the interruption, resulting in certain time consumption.

The present disclosure provides a deep learning network model operation optimization solution based on the FPGA. Consecutive operators in a target model are packaged, and are dispatched and operated on the FPGA at one time, to complete computation of multiple operators of a deep learning network model, so that the operation efficiency of the model is enhanced.

Figure 1:
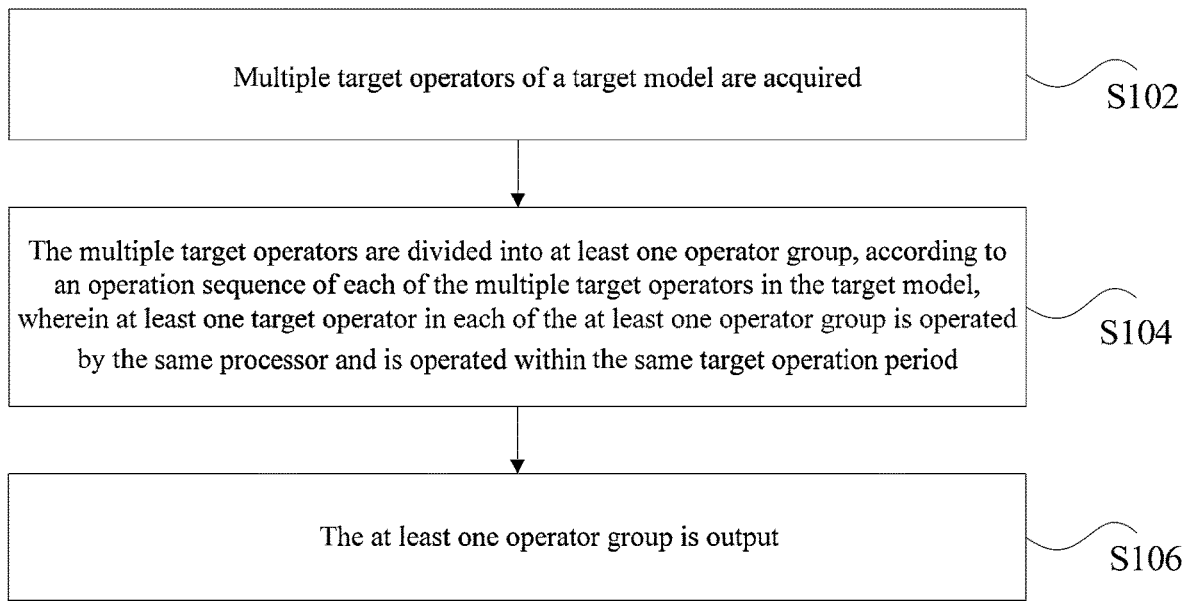
FIG. 1 is a flowchart of a method for processing data according to an embodiment of the present disclosure.

FIG. 1 is a flowchart of a method for processing data according to an embodiment of the present disclosure. As shown in FIG. 1, the method may include the following steps.

At step S102, multiple target operators of a target model are acquired.

In the technical solution provided in the above step S102 of the present disclosure, when the deep learning network model accelerates the computation on the FPGA, it is usually to place at least one computational operator in the model on the FPGA and place at least one logical operator on the CPU. The CPU dispatches and operates the operators one by one. For example, acquisition of the multiple target operators of the target model may be to acquire the at least one computational operator and the at least one logical operator in the deep learning network model.

In this embodiment, the target model may be the deep learning network model. The deep learning network model may be a convolutional neural network model. The convolutional neural network model is a class of feedforward neural networks that include computation with deep structures, which has an ability of representational learning.

In this embodiment, the multiple target operators may include at least one computational operator and the at least one logical operator in the deep learning network model, wherein the computational operator may be an operator requiring a large number of computational operations, and the logical operator may be an operator mainly based on a logical operation.

At step S104, the multiple target operators are divided into at least one operator group, according to an operation sequence of each of the multiple target operators in the target model, wherein at least one target operator in each of the at least one operator group is operated by the same processor and is operated within the same target operation period.

In the technical solution provided in the above step S104 of the present disclosure, the multiple target operators are divided into the at least one operator group, according to the operation sequence of each of the multiple target operators in the target model. For example, by analyzing a structure of the deep learning network model, it is determined that the sequences of a large number of computational operators executed in the deep learning network model are consecutive, so that fine-grained and consecutive computational operators may be packaged into a coarse-grained operator by using a rapid dispatch technology. In this way, the CPU only needs to perform dispatching once, and then the dispatching and computation of theses consecutive computational operators are performed in the FPGA.

In this embodiment, the operator group may include the coarse-grained operators or combined operators.

In this embodiment, the multiple target operators may be divided into the at least one operator group by using the dispatch technology and an operation chart optimization technology. The operation chart optimization technology may be used for adjusting the sequences of the operators and arrange the operators without dependency backward, so that FPGA operators can be arranged as consecutively as possible in an operation chart. One coarse-grained operator package can include more computational operators.

In this embodiment, at least one target operator in each of the at least one operator group is operated by the same processor and is operated within the same target operation period. For example, after a dispatch operation is completed, an interruption is then sent to the CPU for being processed. The CPU then dispatches the operation of the next CPU operator or the target operators (Dispatch OP) in the operator group. The at least one target operator in each of the at least one operator group is operated within the same target operation period.

In this embodiment, preferably, the operation chart optimization may first be performed on the multiple target operators, and then dispatch packaging is performed on the multiple target operators.

In this embodiment, optionally, the sequence identifier of each of the multiple target operators is acquired, wherein the sequence identifier is used for indicating an operation sequence of a target operator corresponding to this sequence identifier in the target model. Then, the multiple target operators are divided into the at least one operator group, according to the sequence identifier of each of the multiple target operators.

For example, the computational operator (FPGA OP) is the operator requiring a large number of computational operations, such as convolution operator (cony), pooling operator (pool), depthwise separable convolution operator (dwconv), batch normalization operator (batchnorm), scaling operator (scale), logistic regression operator (softmax), and fully connected layer operator 1 (fc1).

The logical operator (CPU OP) is the operator mainly based on logical operations, such as reshaping operator (reshape), transpose operator (transpose), and dropout operator (dropout).

The following structure of the deep learning network model is used for description.

conv1->conv2->pool1->reshape->conv3->fc1
Logical operator (CPU OP): reshape;
Fine-grained operator: conv1, conv2, pool1, reshape, conv3, and fc1; and Coarse-grained operator (Dispatch OP): dispatch-op1 (conv1, conv2, pool1), and dispatch-op2 (conv3, fc1).

The first CPU dispatching: operating dispatch-op1 (conv1, conv2, pool1), and dispatching is completed in the FPGA;

The second CPU dispatching: operating the reshape operator; and

The Third CPU dispatching: operating dispatch-op2 (conv3, fc1), and dispatching is completed in the FPGA.

At step S106, the at least one operator group is output.

In the technical solution provided in the above step S106 of the present disclosure, the at least one operator group is output. For example, after the multiple target operators are divided into at least one operator group by using the dispatch technology and the operation chart optimization technology, the at least one operator group is output. The at least one computational operators is placed on the FPGA for operation, and the at least one logical operators is placed on the CPU for operation.

Through the above steps S102 to S106, the multiple target operators of the target model are acquired. The multiple target operators are divided into the at least one operator group, according to the operation sequence of each of the multiple target operators in the target model, wherein the at least one target operator in each of the at least one operator group is operated by the same processor and is operated within the same target operation period. Then the at least one operator groups are output. That is to say, in this present application, by dividing the multiple acquired target operators of the target model into the at least one operator group, according to the operation sequence of each of the multiple target operators in the target model, the at least one operator group may be dispatched when the target model is operated. Therefore, the purpose of reducing the number of dispatching times when the target model is operated is realized, and the technical problem of low operation efficiency of the model is resolved, thereby the technical effect of operating the target model by dispatching the operator group is achieved.

The above method of this embodiment is further described in detail below.

As an optional implementation, the method may further include: a sequence identifier of each of the multiple target operators is acquired, wherein the sequence identifier is used for indicating an operation sequence of a target operator corresponding to this sequence identifier in the target model. The step S104 that the multiple target operators are divided into the at least one operator group, according to the operation sequence of each of the multiple target operators in the target model may include: the multiple target operators are divided into the at least one operator group, according to the sequence identifier of each of the multiple target operators.

In this embodiment, the sequence identifier of each of the multiple target operators may be acquired. For example, a large number of computational operators in the deep learning network model are consecutive during computation. These consecutive computational operators are acquired, and are packaged into the coarse-grained operator by using the dispatch technology and the operation chart optimization technology. Then, the FPGA is dispatched to operate the computation.

In this embodiment, the sequence identifier of the target operator may be a serial number of the target operator. The sequence identifier is used for indicating an operation sequence of a target operator corresponding to this sequence identifier in the target model. The sequence identifiers of multiple first target operators are consecutive. That is to say, the multiple sequence identifiers being consecutive means that the multiple sequence identifiers have adjacent relationships, which correspond to adjacent orders of the multiple first target operators in a sequence of execution. For example, the sequence identifier 1, the sequence identifier 2, the sequence identifier 5 and the sequence identifier 6 are successively arranged, which may be understood as consecutive.

In this embodiment, the multiple target operators are divided into at least one operator group according to the sequence identifier of each of the multiple target operators. For example, the fine-grained and consecutive computational operators may be packaged into the coarse-grained operator by using the dispatch technology, so that the multiple target operators are divided into the at least one operator group.

In this embodiment, granularity may be a database noun in the field of computer, and may refer to a level of a degree of refinement or integration of data saved in a data unit of a data warehouse.

In this embodiment, by acquiring the sequence identifier of each of the multiple target operators and dividing the multiple target operators into the at least one operator group, according to the sequence identifier of each of the multiple target operators. Therefore, the multiple target operators may be operated according to the sequence identifiers when the at least one operator group is dispatched, so that an effect of reducing the number of dispatching can be achieved.

As an optional implementation, the step that the multiple target operators are divided into the at least one operator group, according to the sequence identifier of each of the multiple target operators may include: in response to sequence identifiers of the multiple first target operators being consecutive, and the multiple first target operators being to be operated on the same processor, the multiple first target operators are divided into one operator group, wherein the multiple target operators include the multiple first target operators; and/or in response to a sequence identifier of a second target operator having no adjacent sequence identifier on the processor, the second target operators is divided into one operator group, wherein the multiple target operators include the second target operator.

In this embodiment, the multiple first target operators may be divided into one operator group in response to the sequence identifiers of the multiple first target operators being consecutive and the multiple first target operators being to be operated on the same processor. The multiple target operators include the multiple first target operators. For example, when the sequence identifiers of the multiple computational operators are detected to be consecutive, and the multiple computational operators are to be operated on the FPGA, a signal used for indicating information above is generated. In response to the signal, the multiple computational operators of which sequence identifiers are consecutive are packaged into one computational operator.

In this embodiment, in response to the sequence identifier of the second target operator having no adjacent sequence identifier on the processor, the second target operator is divided into one operator group, wherein the multiple target operators may include the second target operator. For example, when it is detected that the computational operator having no adjacent sequence identifier on the FPGA during computation and is a single serial number, a signal used for indicating information above is generated. In response to the signal, the computational operator is divided into one operator group.

In this embodiment, whether the sequence identifiers of the multiple first target operators are consecutive is detected. The multiple first target operators of which sequence identifiers are consecutive are divided into one operator group. Then, the second target operator having no adjacent sequence identifiers on the processor is divided into one operator group. In this way, the multiple target operators may be divided into the at least one operator groups based on the consecutive of the sequence identifiers of the multiple target operators. Therefore, the effect of operating the target model by dispatching the at least one operator group can be achieved.

As an optional implementation, the method may further include: in response to types of the multiple first target operators being the same, that the multiple first target operators are to be operated on the same processor is determined.

In this embodiment, the deep learning network model is accelerated by using FPGA hardware. The at least one computational operator is placed on the FPGA for operation, and the at least one logical operator is placed on the CPU for operation.

In this embodiment, when the types of the multiple first target operators are detected to be the same, a signal used for indicating information above is generated. In response to the signal, the multiple first target operators are determined to be operated on the same processor.

In this embodiment, the types of the first target operators may be the computational operator or the logical operator.

In this embodiment, the types of the target operators are detected. Then, the target operators of the same type that are operated on the same processor are determined. In this way, all of the target operators of the same type may be operated on the corresponding processor. Therefore, the effect of operating the target operators on the corresponding processor by dispatching the at least one operator group can be achieved.

As an optional implementation, the method may further include: an association relationship is acquired among the multiple target operators, wherein the step that the multiple target operators are divided into the at least one operator group, according to the sequence identifier of each of the multiple target operators may include: the multiple target operators are divided into the at least one operator group, according to the association relationship and the sequence identifier of each of the multiple target operators.

In this embodiment, there are branches in a network result of the model. Sequential operation is required to be performed after arrangement during computation. The association relationship may be indicated that whether there is a dependent relationship between the multiple target operators.

In this embodiment, the multiple target operators may be divided into the at least one operator group according to the association relationship and the sequence identifier of each of the multiple target operators. For example, the operation chart optimization is performed on the deep learning network model. In this way, the sequences of the target operators are adjusted, and the target operators without dependency are arranged backward, so that the target operators can be arranged as consecutively as possible in an operation chart.

In this embodiment, whether there is an association relationship between the target operators is determined, and the multiple target operators having the association relationship and consecutive sequence identifiers are divided into one operator group, so that the number of the operator groups may be as few as possible when the target model is operated. Therefore, the effect of reducing operations such as system interruption and context switching when the target model is operated can be achieved.

As an optional implementation, the step that multiple target operators are divided into the at least one operator group, according to the association relationship and the sequence identifier of each of the multiple target operators may further include: in response to the association relationship representing that sequence identifiers of multiple third target operators are allowed to be adjusted, and the sequence identifiers of the multiple third target operators being not completely consecutive, the sequence identifiers of the multiple third target operators are adjusted, wherein the multiple target operators include the multiple third target operators, and adjusted sequence identifiers of the multiple third target operators are consecutive; and the multiple target operators are divided into the at least one operator group, according to the adjusted sequence identifiers of the multiple third target operators.

In this embodiment, the multiple third target operators may be operators of which sequence identifiers having a dependent relationship and are not completely consecutive.

In this embodiment, in response to the association relationship representing that sequence identifiers of multiple third target operators are allowed to be adjusted, and the sequence identifiers of the multiple third target operators being not completely consecutive, the sequence identifiers of the multiple third target operators may be adjusted. For example, during performing the operation chart optimization, the multiple target operators may be partially adjusted. When it is detected that the association relationship represents that the sequence identifiers of the multiple third target operators are allowed to be adjusted, and the sequence identifiers of the multiple third target operators are not completely consecutive, a signal used for indicating information above is generated. In response to the signal, the sequence identifiers of the multiple third target operators are partially adjusted.

In this embodiment, after the sequence identifiers of the multiple target operators having an association relationship and non-consecutive sequence identifiers are adjusted, the multiple target operators are divided into the at least one operator group. In this way, the number of the operator groups may further be reduced. Therefore, the effect of reducing the number of dispatching times when the target model is operated can be achieved.

As an optional implementation, the step that the multiple target operators are divided into the at least one operator group, according to the association relationship and the sequence identifier of each of the multiple target operators may further include: in response to the association relationship representing that sequence identifiers of multiple fourth target operators are prohibited to be adjusted, and the sequence identifiers of the multiple fourth target operators being not completely consecutive, at least two fourth target operators of which sequence identifiers are consecutive and which are to be operated on the same processor in the multiple fourth target operators are divided into one operator group, and/or a fourth target operator of which a sequence identifier having no adjacent sequence identifier on the processor in the multiple fourth target operators is divided into one operator group, wherein the multiple target operators include the multiple fourth target operators.

In this embodiment, the fourth target operators may be operators that have no dependent relationship.

In this embodiment, in response to the association relationship representing that sequence identifiers of a plurality of fourth target operators are prohibited to be adjusted, and the sequence identifiers of the multiple fourth target operators being not completely consecutive, the at least two fourth target operators of which sequence identifiers are consecutive and which are to be operated on the same processor in the multiple fourth target operators are divided into one operator group. For example, when it is detected that the association relationship represents that sequence identifiers of a plurality of fourth target operators are prohibited to be adjusted, and the sequence identifiers of the multiple fourth target operators are not completely consecutive, a signal used for indicating information above is generated. In response to the signal, the at least two fourth target operators of which sequence identifiers are consecutive and which are to be operated on the same processor in the multiple fourth target operators are divided into one operator group.

In this embodiment, fourth target operators having no adjacent sequence identifier on the processor in the multiple fourth target operators may be divided into one operator group, wherein the multiple target operators may include the multiple fourth target operators. For example, the computational operators in the multiple computational operators that do not have the adjacent sequence identifiers on the FPGA are divided into one operator group.

In this embodiment, for the multiple target operators that have no association relationship and sequence identifiers of the multiple target operators are not completely consecutive, the sequence identifiers of the multiple target operators are prohibited to be adjusted, and multiple target operators of which sequence identifiers are consecutive in the multiple target operators are divided into one operator group. Then, the second target operator having no adjacent sequence identifiers on the processor is divided into one operator group. In this way, the multiple target operators that have no association relationship are divided into the at least one operator groups. Therefore, the effect of operating the target model by dispatching the operator groups can be achieved.

Figure 2:
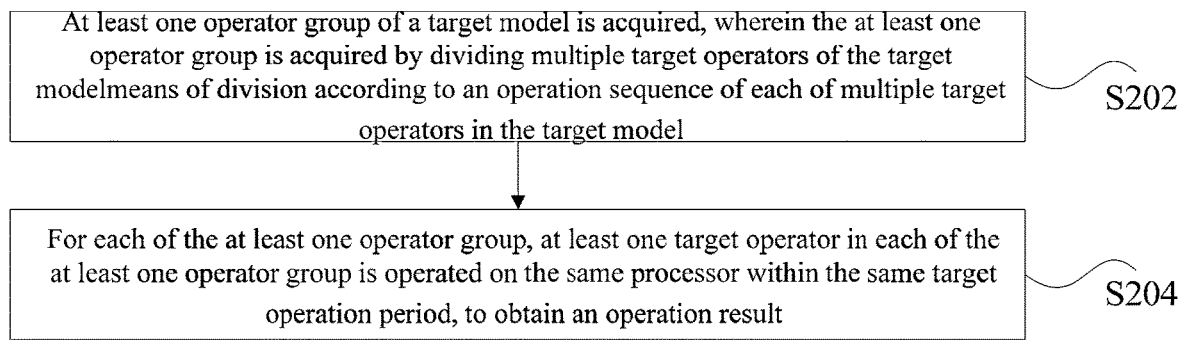
FIG. 2 is a flowchart of a method for processing data provided from an application side according to an embodiment of the present disclosure.

FIG. 2 is a flowchart of a method for processing data for an application according to an embodiment of the present disclosure. As shown in FIG. 2, the method may include the following steps.

At step S202, at least one operator group of a target model is acquired, wherein the at least one operator group is acquired by dividing multiple target operators of the target model according to an operation sequence of each of multiple target operators in the target model.

In the technical solution provided in the above step S202 of the present disclosure, the at least one operator group of the target model is acquired. For example, in a practical application, the at least one operator group of the deep learning network model that are divided according to the operation sequence of each of the multiple target operators of the deep learning network model in deep learning are acquired.

In this embodiment, the target operators may be the at least one computational operator operated on the FPGA and the at least one logical operator operated on the CPU.

At step S204, for each of the at least one operator group, at least one target operator in each of the at least one operator group is operated on the same processor within the same target operation period, to obtain an operation result.

In this embodiment, in the deep learning network model, the fine-grained and consecutive operators are packaged into the coarse-grained operator. Then, the FPGA is dispatched at one time for operation, to complete computation, wherein the logical operators are dispatched by the CPU. The operators are operated one by one.

In an optional embodiment, when the target model is accelerated to operate, customized hardware is generally used for accelerating a common computation task. The FPGA is exactly a hardware reconfigurable architecture. In this embodiment of the present disclosure, the target model may be the deep learning network model. By dividing the multiple acquired target operators of the target model into the at least one operator group, according to the operation sequence of each of the multiple target operators in the target model, the at least one operator group may be dispatched when the target model is operated. When the deep learning network model is accelerated to operate, the at least one computational operator is operated on the FPGA, and the at least one logical operator is operated on the CPU. The at least one operator group of the target model may be first acquired, wherein the at least one operator group is acquired by dividing the multiple target operators of the target model according to the operation sequence of each of multiple target operators in the target model. Then, for each of the at least one operator group, the at least one target operator in the operator group is operated on the same processor within the same target operation period, to obtain an operation result.

In an optional embodiment, when the target model is trained, the target model may be the deep learning network model. Under an image identification application scenario of the deep learning network model, an image of the deep learning network model is inputted to be first loaded to an inputted register. Then, a convolution operation is performed by using an arithmetic unit. The convolution operation may be operated by using multiple arithmetic units, wherein the arithmetic unit may be the FPGA. By dividing the multiple acquired target operators of the target model into the at least one operator group, according to the operation sequence of each of the multiple target operators in the target model, the at least one operator group may be dispatched when the target model is operated. The at least one operator group of the target model may be first acquired. wherein the at least one operator group is acquired by dividing the multiple target operators of the target model according to the operation sequence of each of multiple target operators in the target model. Then, for each of the at least one operator group, the at least one target operator in the operator group is operated on the same processor within the same target operation period, to obtain an operation result.

In an optional embodiment, when the target model is tested, the target model may be the deep learning network model. The testing of the deep learning network model is to systematically evaluate the reliability, portability, and efficiency of a deep learning algorithm. When the reliability and portability of the deep learning network model are evaluated, the impact of a software and a hardware platform for the deep learning network model on the reliability includes a hardware architecture difference, which refers to an impact of different hardware architectures and computing power, processing accuracy thereof on the reliability of the deep learning network model. For some algorithms that require low latency, for example, intelligent drive, delay of the FPGA is lower than delay of a Graphics Processing Unit (GPU).

In addition, in the FPGA, any data source, such as a network interface or a sensor, may be connected, which may be directly connected by using a pin of a chip. Therefore, stability and portability may be enhanced by testing the deep learning network model by the FPGA. When the operation efficiency of the deep learning network model is evaluated, under an image identification application scenario of the deep learning network model, for inputting a picture, a sequence of a convolutional neural network may generally include: input>a convolutional layer>pooling>a fully connected layer>output. In an operation process of the convolutional neural network, by dividing the multiple acquired target operators of the target model into the at least one operator group, according to the operation sequence of each of the multiple target operators in the target model, the at least one operator group may be dispatched when the target model is operated. When the deep learning network model is accelerated to operate, the at least one computational operators is operated on the FPGA, and the at least one logical operator is operated on the CPU. The at least one operator group of the target model may be first acquired, wherein the at least one operator group is acquired by dividing the multiple target operators of the target model according to the operation sequence of each of multiple target operators in the target model. Then, for each of the at least one operator group, the at least one target operator in the operator group is operated on the same processor within the same target operation period, to obtain an operation result.

As an optional implementation, the step S204 that for each of the at least one operator group, the at least one target operator in each of the at least one operator group on the same processor within the same target operation period, to obtain the operation result may further include: in response to a driving instruction sent from a first processor, successively operating the at least one target operator in each of the at least one operator group on the first processor or a second processor, to obtain the operation result.

In this embodiment, in response to the driving instruction from the first processor, the at least one target operator in each of the at least one operator group is successively operated on the first processor or the second processor, to obtain the operation result. For example, when a driving instruction signal from the CPU for dispatching operation is detected, and in response to the driving instruction signal, the at least one target operator in each of the at least one operator group is successively operated on the CPU or the FPGA associated with the target operator, to obtain the operation result.

In this embodiment, the operation of the target operator on the CPU associated with the target operator may be the logical operator operated on the CPU. The operation of the target operator on the FPGA associated with the target operator may be the computational operator operated on the FPGA. In addition, each of the at least one operator group (including a logical operator group and a computational operator group) may include at least one operator. During the dispatching and operation of the CPU, the operators of the logical operator group are operated on the CPU according to the sequence identifiers, and the operators of the computational operator group are operated on the FPGA according to the sequence identifiers.

As an optional implementation, after the step S204 that the at least one target operator in each of the at least one operator group is successively operated on the corresponding second processor, to obtain the operation result, the method may further include: an interruption instruction is output to the first processor, wherein the interruption instruction is used for interrupting the first processor.

In this embodiment, the interruption instruction may be output to the first processor, wherein the interruption instruction is used for interrupting the first processor. For example, after the consecutive operators in the deep learning network model are packaged by using the Dispatch technology and the operation chart optimization technology, the CPU dispatches the FPGA to operate at one time, which generates operations such as system interruption, register configuration and context switching.

In this embodiment of the present disclosure, the at least one operator group of the target model is acquired, wherein the at least one operator group is obtained by dividing the multiple target operators of the target model according to the operation sequence of each of multiple target operators in the target model. For each of the at least one operator group, the at least one target operator in the operator group is operated on the same processor within the same target operation period, to obtain the operation result. That is to say, the consecutive operators in the target model are packaged, and are dispatched and operated on the FPGA at one time, to complete the computation of multiple operators of a deep learning network model, so that an operation efficiency of the model is enhanced. Therefore, the technical problem of low operation efficiency of the model is resolved, thereby the technical effect of the operation efficiency of the model is achieved.

The method for processing data of the present disclosure is further introduced below with reference to the preferred embodiments.

The operators in the deep learning network model are dispatched by the CPU and are operated one by one. Each of the at least one operator operated on the FPGA is required to dispatch the FPGA to operate once, which result in the operations such as system interruption, register configuration and context switching once, extra time is required to be consumed.

The operators in the deep learning network model are dispatched by the CPU and are operated one by one. The following network structure is used as one example.

Convolution 1 (conv1)->Convolution 2 (conv2)->Pooling 1 (pool1)->Readjustment (reshape)->Convolution 3 (conv3)->Fully connected layer 1 (fc1)

These operators are dispatched and operated. The CPU sends configuration to the FPGA by a driver and an Advanced extensible Interface (AXI) bus. Then, the driver enters a blocking state. When the FPGA ends an operation, the FPGA sends interruption to the CPU, and then the driver continues to executing. In this way, an OP operation ends, and then a next operator is configured for operation. A specific sequence includes the following.

The first CPU dispatching: operating conv1;
The second CPU dispatching: operating conv2;
The third CPU dispatching: operating pool1;
The fourth CPU dispatching: operating reshape;
The fifth CPU dispatching: operating conv3; and
The sixth CPU dispatching: operating fc1.

Two parts in the above process may impact performance. One is that a prediction framework changes from a user mode of an operating system to a kernel mode, and then returns back to the user mode, which requires context switching. Two is that an operation of each of at least one operator needs to be processed an interruption. A multi-user network operating system (Linux) has relatively poor response to the interruption, resulting in certain time consumption.

In the present invention, computational acceleration performance of the deep learning network model on an FPGA device is improved by the dispatch technology and the operation chart optimization technology. The fine-grained and consecutive operators are packaged into the coarse-grained operator. Then, the FPGA is dispatched at one time for operation, to complete computation. Therefore, multiple operations such as system interruption, register configuration and context switching become one operation such as system interruption, register configuration and context switching.

Figure 3:
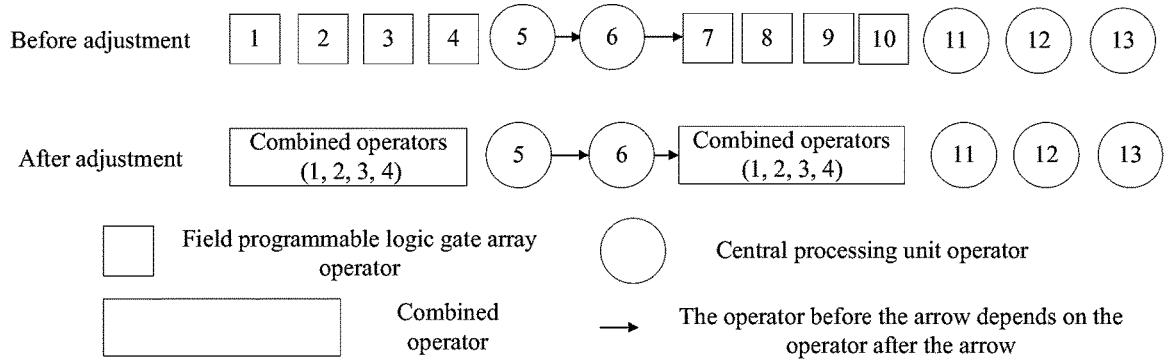
FIG. 3 is a flowchart of a method for adjusting an operator by using a dispatch technology according to an embodiment of the present disclosure.

FIG. 3 is a flowchart of a method for adjusting an operator by using a dispatch technology according to an embodiment of the present disclosure. As shown in FIG. 3, by analyzing the structure of the deep learning network model, it is determined that the sequences of a large number of computational operators executed in the network model are consecutive. The dispatch technology is a technology that packages the fine-grained and consecutive operators into the coarse-grained operator, and only requires the CPU to dispatch once to perform the dispatching and computation of these consecutive computational operators in the FPGA. After one dispatch operation is completed, an interruption instruction is then sent to the CPU for processing. Then the CPU dispatches the operation of the next CPU operator or the coarse-grained operator (Dispatch OP). After the dispatch technology is used, the multiple operations such as system interruption and context switching become one operation such as system interruption and context switching.

The computational operator (FPGA OP) is the operator requiring a large number of computational operations, such as convolution operator (cony), pooling operator (pool), depthwise separable convolution operator (dwconv), batch normalization operator (batchnorm), scaling (scale), logistic regression operator (softmax), and fully connected layer operator 1 (fc1).

The logical operator (CPU OP) is the operator mainly based on logical operations, such as reshaping operator (reshape), transpose operator (transpose), and dropout operator (dropout).

The following structure of the deep learning network model is used for describing the above operators.

conv1->conv2->pool1->reshape->conv3->fc1

Logical operator (CPU OP): reshape;

Fine-grained operator: conv1, conv2, pool1, reshape, conv3, and fc1; and

Coarse-grained operator (Dispatch OP): dispatch-op1 (conv1, conv2, pool1), and dispatch-op2 (conv3, fc1).

The first CPU dispatching: operating dispatch-op1 (conv1, conv2, pool1), and dispatching is completed in the FPGA;

The second CPU dispatching: operating reshape; and

The third CPU dispatching: operating dispatch-op2 (conv3, fc1), and dispatching is completed in the FPGA.

Figure 4:
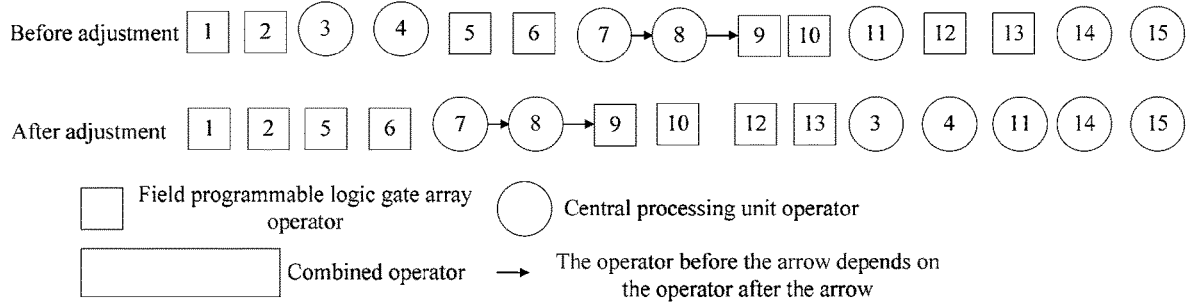
FIG. 4 is a flowchart of a method for adjusting an operator by using an operation chart optimization technology according to an embodiment of the present disclosure.

FIG. 4 is a flowchart of a method for adjusting an operator by using an operation chart optimization technology according to an embodiment of the present disclosure. As shown in FIG. 4, before adjustment, the FPGA operators are packaged into four coarse-grained operators; and after adjustment, the operators are packaged into two coarse-grained operators. The packaging of the coarse-grained operators by means of the dispatch technology has not achieve an optimal optimization, so that the operation chart optimization may also be performed on the deep learning network model. In this way, the sequences of the operators are adjusted, and the operators without dependency are arranged backward, so that FPGA operators can be arranged as consecutively as possible in an operation chart. One coarse-grained operator package may include more FPGA OPs.

In this embodiment of the present disclosure, by using the dispatch technology to adjust the operators, a large number of CPU dispatching operations are reduced before optimization. By using the operation chart optimization technology to adjust the operators, the operation chart optimization is performed on the deep learning network model, and the sequences of the operators are adjusted, so that the operation efficiency of the deep learning network model can be enhanced. Therefore, the technical problem of low operation efficiency of the model is resolved, thereby the technical effect of the operation efficiency of the model is achieved.

An embodiment of the present disclosure further provides a data processing apparatus configured to perform the method for processing data of the embodiment shown in FIG. 1.

Figure 5:
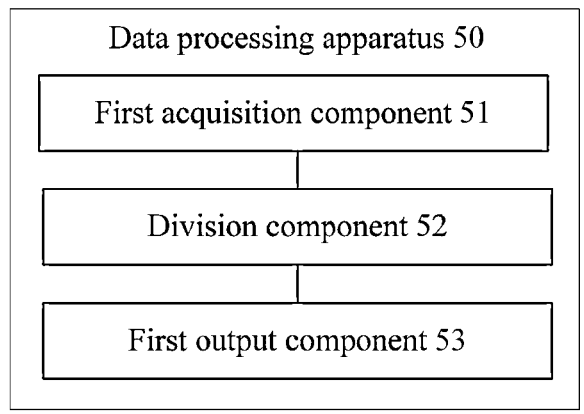
FIG. 5 is a schematic diagram of a data processing apparatus according to an embodiment of the present disclosure.

FIG. 5 is a schematic diagram of a data processing apparatus according to an embodiment of the present disclosure. As shown in FIG. 5, the data processing apparatus 50 may include a first acquisition component 51, a division component 52, and a first component 53.

The first acquisition component 51 is configured to acquire multiple target operators of a target model.

The division component 52 is configured to divide the multiple target operators into at least one operator group, according to an operation sequence of each of the multiple target operators in the target model, wherein at least one target operator in each of the at least one operator group is operated by the same processor and is operated within the same target operation period.

The first output component 53 is configured to output the at least one operator group.

Optionally, the division component 52 may include a first acquisition component and a first division component. The first division component may include a first division sub-component and a second division sub-component. The first division sub-component may include an operation sub-component.

The first acquisition component is configured to acquire a sequence identifier of each of the multiple target operators, wherein the sequence identifier is used for indicating an operation sequence of a target operator corresponding to this sequence identifier in the target model. The first division component is configured to divide the multiple target operators into the at least one operator group, according to the sequence identifier of each of the multiple target operators. The first division sub-component is configured to, in response to sequence identifiers of multiple first target operators being consecutive, and the multiple first target operators being to be operated on the same processor, divide the multiple first target operators into one operator group, wherein the multiple target operators include the multiple first target operators. And/or the second division sub-component is configured to, in response to a sequence identifier of a second target operator having no adjacent sequence identifier on the processor, divide the second target operators into one operator group. The target operators include the second target operators. The operation sub-component is configured to, in response to types of the multiple first target operators being the same, determine that the multiple first target operators are to be operated on the same processor.

Optionally, the first acquisition component may include a first acquisition sub-component. The first division component may include a third division sub-component. The third division sub-component may include an adjustment component a first division sub-component, and a second division sub-component.

The first acquisition sub-component is configured to acquire an association relationship among the multiple target operators. The third division sub-component is configured to divide the multiple target operators into the at least one operator group according to the association relationship and the sequence identifier of each of the multiple target operators. The adjustment component is configured to, in response to the association relationship representing that sequence identifiers of a plurality of third target operators are allowed to be adjusted, and the sequence identifiers of the multiple third target operators being not completely consecutive, adjust the sequence identifiers of the multiple third target operators, wherein the being target operators may include the multiple third target operators, and adjusted sequence identifiers of the multiple third target operators are consecutive. The first division sub-component is configured to divide the multiple target operators into the at least one operator group, according to the adjusted sequence identifiers of the multiple third target operators. The second division sub-component is configured to, in response to the association relationship representing that sequence identifiers of multiple fourth target operators are prohibited to be adjusted, and the sequence identifiers of the plurality of fourth target operators being not completely consecutive, determine at least two fourth target operators of which sequence identifiers are consecutive and which are to be operated on the same processor in the plurality of fourth target operators as one operator group, and/or determine a fourth target operator of which a sequence identifier having no adjacent sequence identifier on the processor in the plurality of fourth target operators as one operator group, wherein the plurality of target operators comprise the plurality of fourth target operators.

An embodiment of the present disclosure further provides, from an application side, a data processing apparatus configured to perform the method for processing data of the embodiment shown in FIG. 2.

Figure 6:
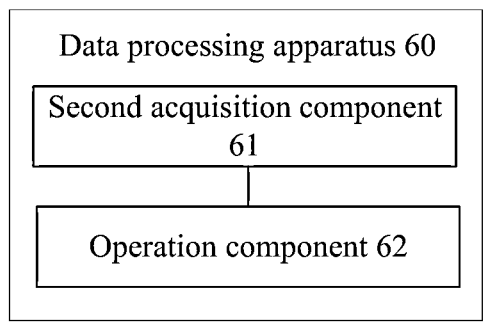
FIG. 6 is a schematic diagram of a data processing apparatus provided from an application side according to an embodiment of the present disclosure.

FIG. 6 is a schematic diagram of a data processing apparatus provided from an application side according to an embodiment of the present disclosure. As shown in FIG. 6, the data processing apparatus 60 may include a second acquisition component 61 and an operation component 62.

The second acquisition component 61 is configured to acquire at least one operator group of a target model, wherein the at least one operator group is acquired by dividing a plurality of target operators of the target model according to an operation sequence of each of the plurality of target operators in the target model.

The operation component 62 is configured to, for each of the at least one operator group, operate at least one target operator in each of the at least one operator group on the same processor within the same target operation period, to obtain an operation result.

Optionally, the operation component 62 may include an operation sub-component. The operation sub-component may include an interruption component.

The operation sub-component is configured to, in response to a driving instruction sent from a first processor, successively operate the at least one target operator in each of the at least one operator group on a first processor or a second processor, to obtain the operation result. The interruption component is configured to output an interruption instruction to the first processor, wherein the interruption instruction is used for interrupting the first processor.

In this embodiment of the present disclosure, the first acquisition component 51 is configured to acquire the multiple target operators of the target model. The division component 52 is configured to divide the multiple target operators into at least one operator group, according to the operation sequence of each of the multiple target operators in the target model, wherein at least one target operator in each of the at least one operator group is operated by the same processor and is operated within the same target operation period. The first output component 53 is configured to output the at least one operator group.

The second acquisition component 61 is configured to acquire at least one operator group of the target model, wherein the at least one operator group is acquired by dividing a plurality of target operators of the target model according to an operation sequence of each of the plurality of target operators in the target model. The operation component 62 is configured to, for each of the at least one operator group, operate at least one target operator in each of the at least one operator group on the same processor within the same target operation period, to obtain an operation result. That is to say, in this present application, the consecutive operators in the target model are packaged, and are dispatched and operated on the FPGA at one time, to complete the computation of multiple operators of a deep learning network model, so that the operation efficiency of the model is enhanced. Therefore, the technical problem of low operation efficiency of the model is resolved, thereby the technical effect of the operation efficiency of the model is achieved.

In this embodiment of the present disclosure, in the technical solution of the present disclosure, the involved acquisition, storage, and application of personal information of a user are in compliance with relevant laws and regulations, and do not violate public order and good customs.

According to an embodiment of the present disclosure, an electronic device, a readable storage medium, and a computer program product are further provided in the present disclosure.

An electronic device are provided in an embodiment of the present disclosure. The electronic device may include: at least one processor; and a memory, communicatively connected with the at least one processor, wherein the memory stores at least one instruction executable by the at least one processor, and the at least one instruction is performed by the at least one processor, so as to enable the at least one processor to perform the voice method for processing data provided in the embodiments of the present disclosure.

Optionally, the above electronic device may further include a transmission device and an input/output device. The transmission device is connected to the above-mentioned processor, and the input/output device is connected to the processor.

Optionally, in this embodiment, the non-transitory computer-readable storage medium may be configured to store a computer program for performing the following steps.

At step S11, multiple target operators of a target model are acquired.

At step S12, the multiple target operators are divided into at least one operator group, according to an operation sequence of each of the multiple target operators in the target model, wherein at least one target operator in each of the at least one operator group is operated by the same processor and is operated within the same target operation period.

At step S13, the at least one operator group is output.

Optionally, in this embodiment, the non-transitory computer-readable storage medium may also be configured to store a computer program for performing the following steps.

At step S21, at least one operator group of a target model is acquired, wherein the at least one operator group is acquired by dividing a plurality of target operators of the target model according to an operation sequence of each of the plurality of target operators in the target model.

At step S22, for each of the at least one operator group, the at least one target operator in the operator group is operated on the same processor within the same target operation period, to obtain an operation result.

Optionally, in this embodiment, the above-mentioned non-transitory computer-readable storage medium may include, but is not limited to, an electronic, magnetic, optical, electromagnetic, infrared, or semiconductor system, device, or apparatus, or any suitable combinations of the foregoing. More specific examples of the readable storage medium may include electrical connections based on at least one wire, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations of the foregoing.

An embodiment of the present disclosure further provides a computer program product, including a computer program. When the computer program is performed by a processor, the following steps are implemented.

At step S11, multiple target operators of a target model are acquired.

At step S12, the multiple target operators are divided into at least one operator group, according to an operation sequence of each of the multiple target operators in the target model. The target operators in each of the at least one operator group are operated by the same processor and are operated within the same target operation period.

At step S13, the at least one operator group is output.

Optionally, in this embodiment, the computer program may also implement the following steps when being performed by a processor.

At step S21, at least one operator group of a target model is acquired. The at least one operator group is obtained by means of division according to an operation sequence of each of multiple target operators of the target model in the target model.

At step S22, for each of the at least one operator group, the target operators in the operator group are operated on the same processor within the same target operation period, to obtain an operation result.

Figure 7:
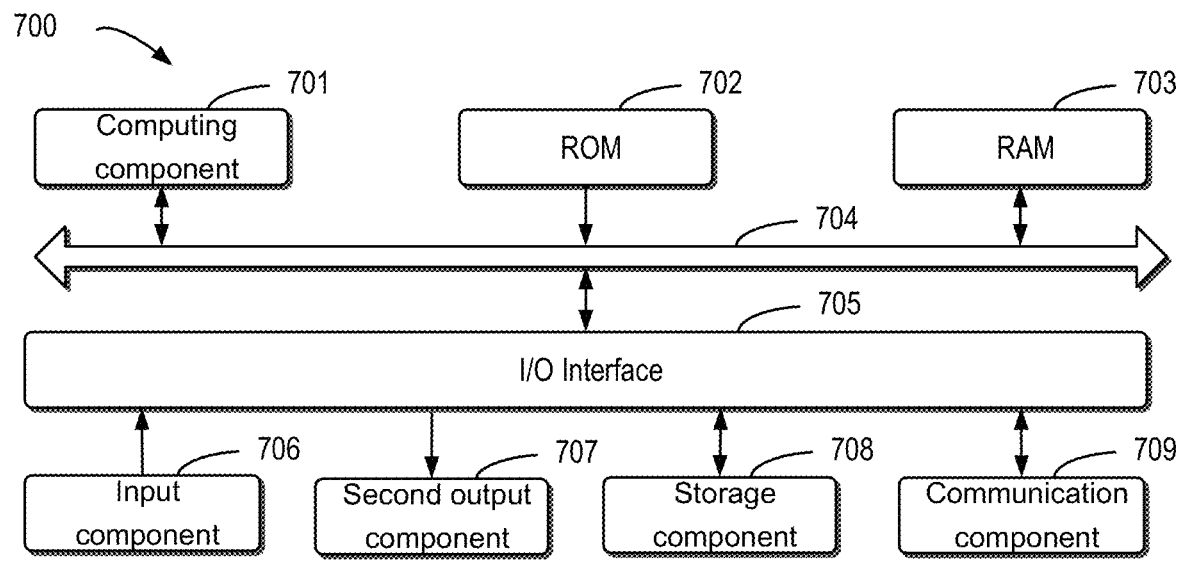
FIG. 7 is a schematic block diagram of an electronic device according to an embodiment of the present disclosure.

FIG. 7 is a schematic block diagram of an electronic device according to an embodiment of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processing, cellular phones, smart phones, wearable devices, and other similar computing devices. The components shown herein, connections and relationships of the components and functions of the components are merely examples, and are not intended to limit the implementation of the present disclosure described and/or required herein.

FIG. 7 is a schematic block diagram of an example electronic device 700 configured to implement an embodiment of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processing, cellular phones, smart phones, wearable devices, and other similar computing devices. The components shown herein, their connections and relationships, and their functions are merely examples, and are not intended to limit the implementation of the present disclosure described and/or required herein.

As shown in FIG. 7, the device 700 may include a computing component 701. The computing component may perform various appropriate actions and processing operations according to a computer program stored in a Read-Only Memory (ROM) 702 or a computer program loaded from a storage component 708 into a Random Access Memory (RAM) 703. In the RAM 703, various programs and data required for the operation of the device may also be stored. The computing component 701, the ROM 702, and the RAM 703 are connected to each other by using a bus 704. An Input/Output (I/O) interface 705 is also connected to the bus 704.

Multiple components in the device 700 are connected to the I/O interface 705, and may include: an input component 706, such as a keyboard and a mouse; a second output component 707, such as various types of displays and loudspeakers; the storage component 708, such as a magnetic disk and an optical disc; and a communication component 709, such as a network card, a modem, and a wireless communication transceiver. The communication component 709 allows the device 700 to exchange information/data with other devices through a computer network, such as the Internet, and/or various telecommunication networks.

The computing component 701 may be various general and/or special processing assemblies with processing and computing capabilities. Some examples of the computing component 701 may include, but are not limited to, a Central Processing Unit (CPU), a Graphics Processing Unit (GPU), various dedicated Artificial Intelligence (AI) computing chips, various computing components that running machine learning model algorithms, a Digital Signal Processor (DSP), and any appropriate processors, controllers, microcontrollers, and the like. The computing component 701 performs the various methods and processes operations described above, for example, the method for processing data. For example, in some embodiments, the method for processing data may be implemented as a computer software program, which is tangibly contained in a machine-readable medium, such as the storage component 708. In some embodiments, part or all of the computer programs may be loaded and/or installed on the device 700 via the ROM 702 and/or the communication component 709. When the computer program is loaded into the RAM 703 and performed by the computing component 701, at least one steps of the method for processing data described above may be performed. Alternatively, in other embodiments, the computing component 701 may be configured to perform the method for processing data in any other suitable manners (for example, by means of firmware).

Various implementations of the systems and technique described herein may be implemented in a digital electronic circuit system, an integrated circuit system, a Field Programmable Gate Array (FPGA), an Application-Specific Integrated Circuit (ASIC), an Application-Specific Standard Product (ASSP), a System-On-Chip (SOC), a Complex Programmable Logic Device (CPLD), computer hardware, firmware, software, and/or a combination thereof. These various implementations may include: being implemented in at least one computer program, the at least one computer program may be performed and/or interpreted on a programmable system including at least one programmable processor. The programmable processor may be a dedicated or general programmable processor, and may receive data and instructions from a storage system, at least one input device, and at least one output device, and transmit the data and instructions to the storage system, the at least one input device, and the at least one output device.

Program codes for implementing the method of the present disclosure can be written in any combination of at least one programming languages. These program codes can be provided to at least one processor or controller of at least one general computer, at least one special computer, or other programmable data processing devices, so that, when the program code is performed by the at least one processor or at least one controller, the functions/operations specified in the flowcharts and/or block diagrams are implemented. The program codes can be performed entirely or partially executed on a machine, partially performed on a remote machine as an independent software package, and partially executed on a remote machine, or entirely executed on the remote machine or a server.

In the context of the present disclosure, a machine-readable medium may be a tangible medium, which may include or store at least one program for being used by at least one instruction execution system, device, or apparatus or in combination with the instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor system, device, or apparatus, or any foregoing suitable combinations. More specific examples of the machine-readable storage medium may include electrical connections based on at least one wire, a portable computer disk, a hard disk, a random-access memory (RAM), a read-only memory (ROM), an Erasable Programmable Read-Only Memory (EPROM or flash memory), an optical fiber, a portable Compact Disk Read-Only Memory (CD-ROM), an optical storage device, a magnetic storage device, or any suitable combination of the foregoing.

In order to provide interaction with a user, the system and technologies described herein may be implemented on a computer, including a display device for displaying information to the user (for example, a Cathode Ray Tube (CRT) or a Liquid Crystal Display (LCD) monitor), a keyboard and a pointing device (for example, a mouse or a trackball). The user can provide an input to the computer by using the keyboard and the pointing device. Other types of devices may also be configured to provide interaction with the user. For example, a feedback provided to the user may be any form of sensory feedback (such as visual feedback, auditory feedback, or tactile feedback), and may be the input from the user may be received in any form (including acoustic input, voice input, or tactile input).

The system and technologies described herein may be implemented in a computing system (for example, as a data server) including a back-end component, or a computing system (for example, an application server) including a middleware component, or a computing system (for example, a user computer with a graphical user interface or network browser, the user may be in interaction with implementations of the system and technologies described herein by using the graphical user interface or network browser) including a front-end component, or a computing system including any combination of the back-end component, the middleware component, or the front-end component. The components of the system can be connected to each other through any form or digital data communication (for example, a communication network) of the medium. Examples of the communication networks include a Local Area Network (LAN), a Wide Area Network (WAN), and the Internet.

The computer system may include at least one client and a server. The at least one client and the at least one server are generally far away from each other and usually interact through a communication network. A relationship between the at least one client and the at least one server are generated by the computer program that is run on the corresponding computer and has a client-server relationship with each other. The server can be a cloud server or a server of a distributed system or a server combined with a blockchain.

It should be understood that the various forms of flows shown above can be used to reorder, add or delete steps. For example, the steps described in the present disclosure may be executed in parallel, sequentially or in a different order, as long as the desired results of the technical solutions disclosed in the present disclosure can be achieved. This is not limited herein.

The above-mentioned specific implementations do not constitute a limitation on the protection scope of the present disclosure. Those skilled person in the art should understand that various modifications, combinations, sub-combinations and substitutions may occur depending on design requirements and other factors. Any modification, equivalent replacement and improvement made within the spirit and principle of the present disclosure shall all fall within the protection scope of the present disclosure.

What is claimed is:

1. A method for processing data, comprising:
    acquiring a plurality of target operators of a target model;
    acquiring a sequence identifier of each of the plurality of target operators, wherein the sequence identifier is used for indicating an operation sequence of a target operator corresponding to this sequence identifier in the target model;
    dividing, according to the sequence identifier of each of the plurality of target operators, the plurality of target operators into at least one operator group, wherein at least one target operator in each of the at least one operator group is operated by a same processor and is operated within a same target operation period; and
    outputting the at least one operator group.

2. The method as claimed in claim 1, wherein the dividing, according to the sequence identifier of each of the plurality of target operators, the plurality of target operators into at least one operator group comprises:
    in response to sequence identifiers of a plurality of first target operators being consecutive, and the plurality of first target operators being to be operated on the same processor, dividing the plurality of first target operators into one operator group, wherein the plurality of target operators comprise the plurality of first target operators.

3. The method as claimed in claim 2, further comprising:
    in response to types of the plurality of first target operators being the same, determining that the plurality of first target operators are to be operated on the same processor.

4. The method as claimed in claim 1, wherein the dividing, according to the sequence identifier of each of the plurality of target operators, the plurality of target operators into at least one operator group comprises:

in response to the sequence identifier of a second target operator having no adjacent sequence identifier on the same processor, dividing the second target operator into one operator group, wherein the plurality of target operators comprise the second target operator.

5. The method as claimed in claim 1, further comprising:
acquiring an association relationship among the plurality of target operators,
wherein the dividing, according to the sequence identifier of each of the plurality of target operators, the plurality of target operators into at least one operator group comprises: dividing the plurality of target operators into the at least one operator group, according to the association relationship and the sequence identifier of each of the plurality of target operators.

6. The method as claimed in claim 5, wherein the dividing the plurality of target operators into the at least one operator group, according to the association relationship and the sequence identifier of each of the plurality of target operators comprises:
in response to the association relationship representing that sequence identifiers of a plurality of third target operators are allowed to be adjusted, and the sequence identifiers of the plurality of third target operators being not completely consecutive, adjusting the sequence identifiers of the plurality of third target operators, wherein the plurality of target operators comprise the plurality of third target operators, and adjusted sequence identifiers of the plurality of third target operators are consecutive; and
dividing the plurality of target operators into the at least one operator group, according to the adjusted sequence identifiers of the plurality of third target operators.

7. The method as claimed in claim 5, wherein the dividing the plurality of target operators into the at least one operator group, according to the association relationship and the sequence identifier of each of the plurality of target operators comprises:
in response to the association relationship representing that sequence identifiers of a plurality of fourth target operators are prohibited to be adjusted, and the sequence identifiers of the plurality of fourth target operators being not completely consecutive, dividing at least two fourth target operators of which sequence identifiers are consecutive and which are to be operated on the same processor in the plurality of fourth target operators into one operator group, wherein the plurality of target operators comprise the plurality of fourth target operators.

8. The method as claimed in claim 5, wherein the dividing the plurality of target operators into the at least one operator group, according to the association relationship and the sequence identifier of each of the plurality of target operators comprises:
in response to the association relationship representing that sequence identifiers of a plurality of fourth target operators are prohibited to be adjusted, and the sequence identifiers of the plurality of fourth target operators being not completely consecutive, dividing a fourth target operator of which a sequence identifier having no adjacent sequence identifier on the same processor in the plurality of fourth target operators into one operator group, wherein the plurality of target operators comprise the plurality of fourth target operators.

9. A method for processing data, comprising:
acquiring at least one operator group of a target model, wherein the at least one operator group is acquired by dividing a plurality of target operators of the target model according to a sequence identifier of each of the plurality of target operators, and the sequence identifier is used for indicating an operation sequence of a target operator corresponding to this sequence identifier in the target model; and
for each of the at least one operator group, operating at least one target operator in each of the at least one operator group on a same processor within a same target operation period, to obtain an operation result.

10. The method as claimed in claim 9, wherein the operating at least one target operator in each of the at least one operator group on the same processor within the same target operation period, to obtain an operation result comprises:
in response to a driving instruction sent from a first processor, successively operating the at least one target operator in each of the at least one operator group on the first processor or a second processor, to obtain the operation result.

11. The method as claimed in claim 10, wherein, after the successively operating the at least one target operator in each of the at least one operator group on a corresponding second processor, to obtain the operation result, the method further comprises:
outputting an interruption instruction to the first processor, wherein the interruption instruction is used for interrupting the first processor.

12. An electronic device, comprising:
at least one processor, and
a memory, communicatively connected with the at least one processor, wherein
the memory stores at least one instruction executable by the at least one processor, and the at least one instruction is performed by the at least one processor, so as to enable the at least one processor to perform the following steps:
acquiring a plurality of target operators of a target model;
acquiring a sequence identifier of each of the plurality of target operators, wherein the sequence identifier is used for indicating an operation sequence of a target operator corresponding to this sequence identifier in the target model;
dividing, according to the sequence identifier of each of the plurality of target operators, the plurality of target operators into at least one operator group, wherein at least one target operator in each of the at least one operator group is operated by a same at least one processor and is operated within a same target operation period; and
outputting the at least one operator group.

13. The electronic device as claimed in claim 12, wherein the dividing, according to the sequence identifier of each of the plurality of target operators, the plurality of target operators into at least one operator group comprises:
in response to sequence identifiers of a plurality of first target operators being consecutive, and the plurality of first target operators being to be operated on the same at least one processor, dividing the plurality of first target operators into one operator group, wherein the plurality of target operators comprise the plurality of first target operators.

14. The electronic device as claimed in claim 13, wherein the at least one instruction is performed by the at least one processor, so as to enable the at least one processor to further perform the following step:

in response to types of the plurality of first target operators being the same, determining that the plurality of first target operators are to be operated on the same at least one processor.

15. The electronic device as claimed in claim 12, wherein the dividing, according to the sequence identifier of each of the plurality of target operators, the plurality of target operators into at least one operator group comprises:

in response to the sequence identifier of a second target operator having no adjacent sequence identifier on the at least one processor, dividing the second target operator into one operator group, wherein the plurality of target operators comprise the second target operator.

16. The electronic device as claimed in claim 12, wherein the at least one instruction is performed by the at least one processor, so as to enable the at least one processor to further perform the following step:

acquiring an association relationship among the plurality of target operators, wherein the dividing, according to the sequence identifier of each of the plurality of target operators, the plurality of target operators into at least one operator group comprises: dividing the plurality of target operators into the at least one operator group, according to the association relationship and the sequence identifier of each of the plurality of target operators.

17. The electronic device as claimed in claim 16, wherein the dividing the plurality of target operators into the at least one operator group, according to the association relationship and the sequence identifier of each of the plurality of target operators comprises:

in response to the association relationship representing that sequence identifiers of a plurality of third target operators are allowed to be adjusted, and the sequence identifiers of the plurality of third target operators being not completely consecutive, adjusting the sequence identifiers of the plurality of third target operators, wherein the plurality of target operators comprise the plurality of third target operators, and adjusted sequence identifiers of the plurality of third target operators are consecutive; and dividing the plurality of target operators into the at least one operator group, according to the adjusted sequence identifiers of the plurality of third target operators.

18. A non-transitory computer-readable storage medium, storing at least one computer instruction, wherein the at least one computer instruction is used for a computer to perform the following steps:

acquiring a plurality of target operators of a target model;

acquiring a sequence identifier of each of the plurality of target operators, wherein the sequence identifier is used for indicating an operation sequence of a target operator corresponding to this sequence identifier in the target model;

dividing, according to the sequence identifier of each of the plurality of target operators, the plurality of target operators into at least one operator group, wherein at least one target operator in each of the at least one operator group is operated by a same processor and is operated within a same target operation period; and outputting the at least one operator group.

* * * * *